United States Patent [19]
Bush et al.

[11] 3,749,217
[45] July 31, 1973

[54] FLUID CLUTCH WITH SELF-CONTAINED PUMP

[75] Inventors: Carl D. Bush, Solvay; Robert S. Root, Syracuse, both of N.Y.

[73] Assignee: Lipe-Rollway Corporation, Syracuse, N.Y.

[22] Filed: Dec. 15, 1971

[21] Appl. No.: 208,121

[52] U.S. Cl. ............... 192/113 B, 192/98, 417/319
[51] Int. Cl. ............................................ F16d 13/72
[58] Field of Search ..................... 192/113 B, 91 A, 192/85 AA, 85 CA; 417/223, 319

[56] References Cited
UNITED STATES PATENTS

| | | | |
|---|---|---|---|
| 2,712,373 | 7/1955 | Smirl | 192/103 F |
| 2,328,090 | 8/1943 | Nutt et al. | 192/85 AA X |
| 3,104,746 | 9/1963 | Gadd et al. | 192/113 B |
| 3,314,513 | 4/1967 | Lake et al. | 192/113 B |

FOREIGN PATENTS OR APPLICATIONS

| | | | |
|---|---|---|---|
| 975,377 | 11/1961 | Germany | 192/113 B |

*Primary Examiner*—Benjamin W. Wyche
*Attorney*—Bruns & Jenney

[57] ABSTRACT

A fluid clutch having a fluid pump contained within the clutch assembly. The pump is fixed against axial or rotational movement and is disposed in the assembly in concentric relation to the output shaft. The pump is driven by a direct connection from the clutch input means and operates whether the clutch friction members are engaged or not. The pump encircles a pull mechanism sleeve that is interposed between it and the output shaft, the sleeve being movable axially entirely independently of the pump to disengage the clutch friction members.

4 Claims, 3 Drawing Figures

INVENTORS.
CARL D. BUSH &
ROBERT S. ROOT
BY
Bruns & Jenney,
Attorneys.

INVENTORS
CARL D. BUSH &
ROBERT S. ROOT
BY
Bruns & Jenny,
ATTORNEYS.

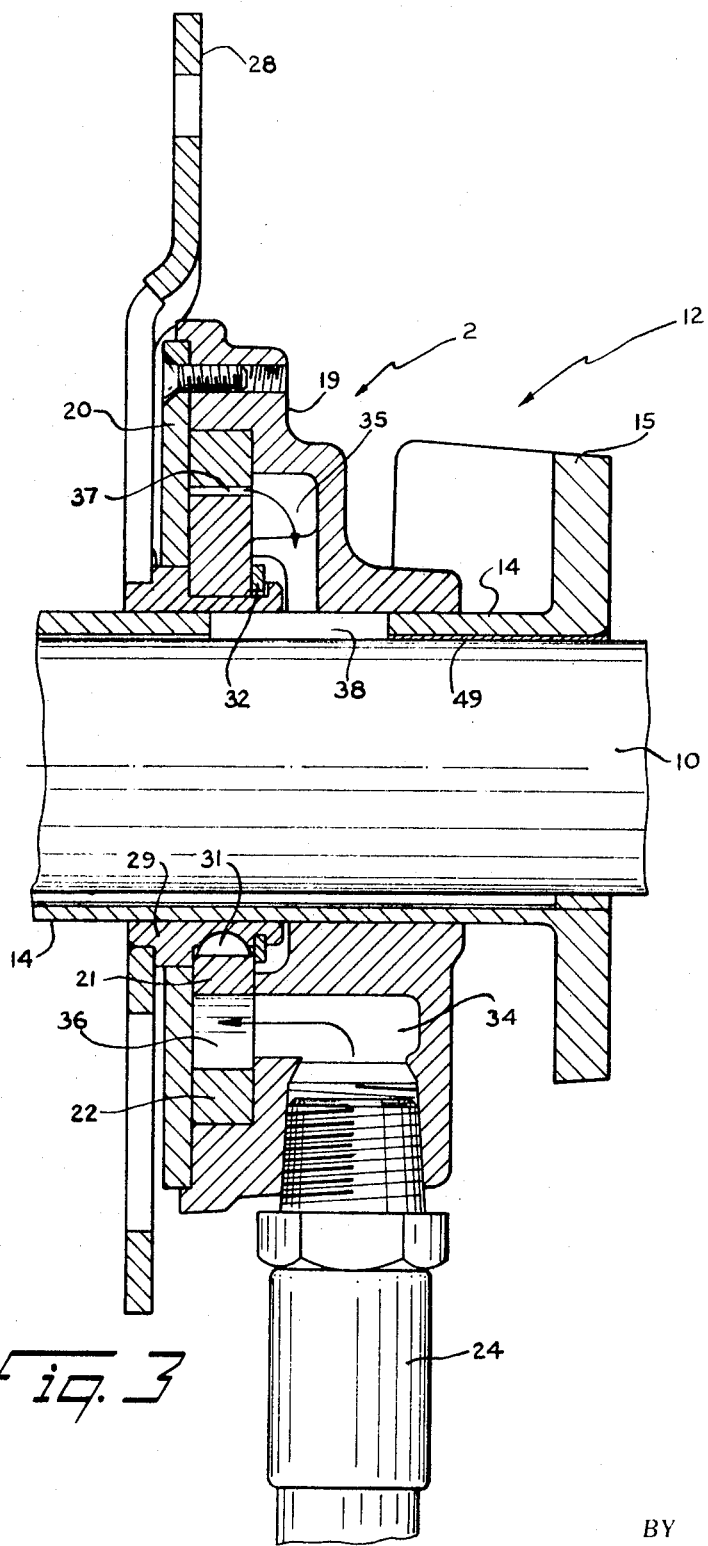

FLUID CLUTCH WITH SELF-CONTAINED PUMP

BACKGROUND OF THE INVENTION

This invention relates to a fluid clutch having a self-contained pump to provide a fluid lubricant and/or coolant during operation.

Although it was recognized in the prior art that by lubricating and cooling the friction discs of a clutch their operational lifetime could be extended, attempts to accomplish this oftentimes involved elaborate systems. In most prior systems the pump has been placed at a distance from the clutch thereby necessitating cumbersome connector lines or hoses to carry the fluid. This is undesirable due to the space such a system requires, the increased probability of failure due to the added parts in the system, and its high cost.

It became apparent therefore that it would be advantageous to incorporate the clutch and pump in the same housing. A number of such self-contained systems are disclosed in U.S. Pat. No. 3,104,476, issued Sept. 24, 1963 to F. O. Gadd et al.; U.S. Pat. No. 3,249,189, issued May 3, 1966 to H. O. Schjolin et al.; U.S. Pat. No. 3,314,513 issued Apr. 18, 1967 to J. Lake et al. and U.S. Pat. No. 3,334,717 issued Aug. 8, 1967 to R. B. Spokas et al.

In the Gadd, Lake and Spokas patents, the pump is concentric with the driven or output shaft and is driven whether the clutch is engaged or not. In the Gadd patent, the pump is driven by a portion of the clutch actuating mechanism while in the Lake and Spokas patents the pump is driven by a sleeve surrounding the output shaft, the sleeves themselves being driven by the clutch input means. In the Schjolin patent, the pump is not disposed concentrically with the driven shaft but is located near the bottom of the clutch housing; it is driven by the clutch input means through gearing.

SUMMARY OF THE INVENTION

The fluid clutch of the present invention was developed to improve the efficiency of clutches with self-contained pumps and, at the same time, to reduce manufacturing costs by simplifying the construction.

In this clutch a reciprocable sleeve, the sole purpose of which is to effect disengagement of clutch, is mounted on the ouput shaft. The pump housing surrounds this clutch actuating sleeve in concentric relation to it and the output shaft, and is held against both axial and rotational movement. Unlike the prior art discussed above, the pump is driven by a relatively direct connection between the clutch input means and the pump rotor which reduces parts and simplifies the construction.

The pump draws fluid from a sump forming a part of the over-all assembly and delivers it through internal passageways to the friction discs, lubricating the output shaft and other parts of the clutch on the way.

BRIEF DESCRIPTION OF THE DRAWINGS

FIG. 3 is an enlarged vertical sectional view of the pump sub-assembly and a portion of the pull mechanism.

DESCRIPTION OF THE PREFERRED EMBODIMENT

Figure 1:
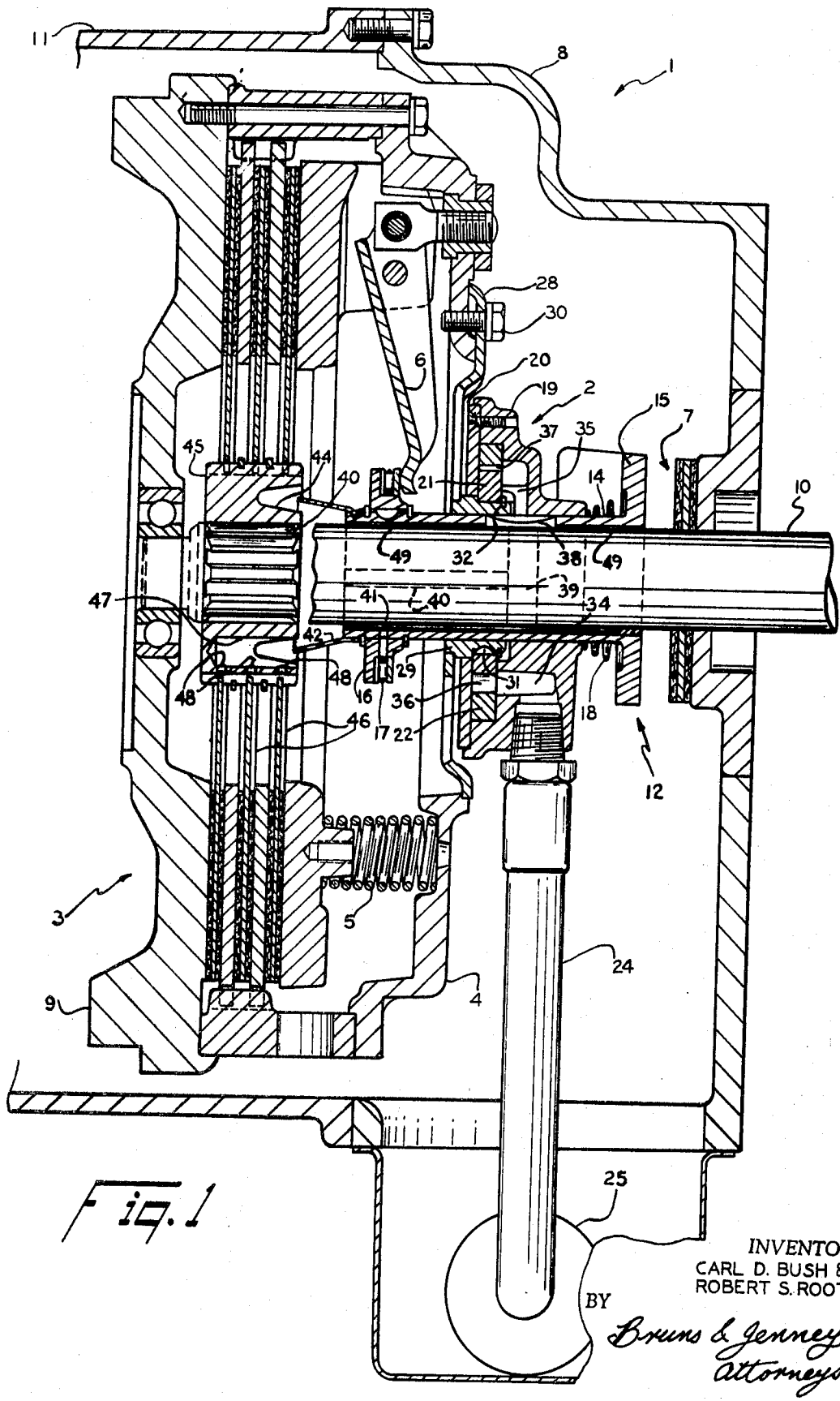
FIG. 1 is a vertical sectional view of a fluid clutch assembly constructed according to the present invention, the section being taken substantially on line 1—1 of FIG. 2.

Referring to FIG. 1, there is shown a fluid clutch assembly 1 having a self-contained pump 2 mounted therein in accord with the present invention. Broadly, the fluid clutch assembly conventionally comprises a clutch 3, a clutch cover plate 4, spring members 5 which urge the clutch friction members into driving relationship, a plurality of throwout levers 6, a brake sub-assembly 7, transmission housing 8, flywheel 9, driven or output shaft 10, flywheel housing 11 and pull mechanism 12. The conventional elements of fluid clutch 1 are not deemed part of this invention as their operation is well known in the art. See, for example, U.S. Pat. No. 3,179,217, issued Apr. 20, 1965 to R. S. Root and assigned to the owner of the present application.

The present invention is directed to the manner in which the pump sub-assembly 2 is arranged and operated in the clutch assembly, and also to the manner in which it coacts with the pull mechanism 12 the function of which is to disengage the clutch friction members. The pull mechanism comprises a sleeve 14 that is slidably supported by the driven shaft 10, the sleeve being formed with a throwout member 15 at its rear end and carrying a collar 16 on its inner or forward end. Collar 16 is fixed on the sleeve as by snap rings and a key, and carries a thrust bearing 17 one race of which engages the free ends of the throwout levers 6 as shown. A coil spring 18 keeps collar 16 and the bearing in engagement with the lever ends.

The pull mechanism sleeve 14 is held against rotation but can be moved rearwardly on shaft 10 by a conventional operating yoke (not shown) which engages portions of the throwout member 15 to effect disengagement of the clutch friction members through the throwout levers 6 in a conventional manner.

In the pump sub-assembly 2, the pump itself is a commercially available gerotor pump of the type manufactured by the W. H. Nichols Company of Waltham, Mass. This comprises a pump body or housing 19 that is concentrically arranged with respect to the driven shaft 10 and sleeve 14, a cover plate 20 and inner and outer gerotors 21,22 (FIG. 3).

Figure 2:
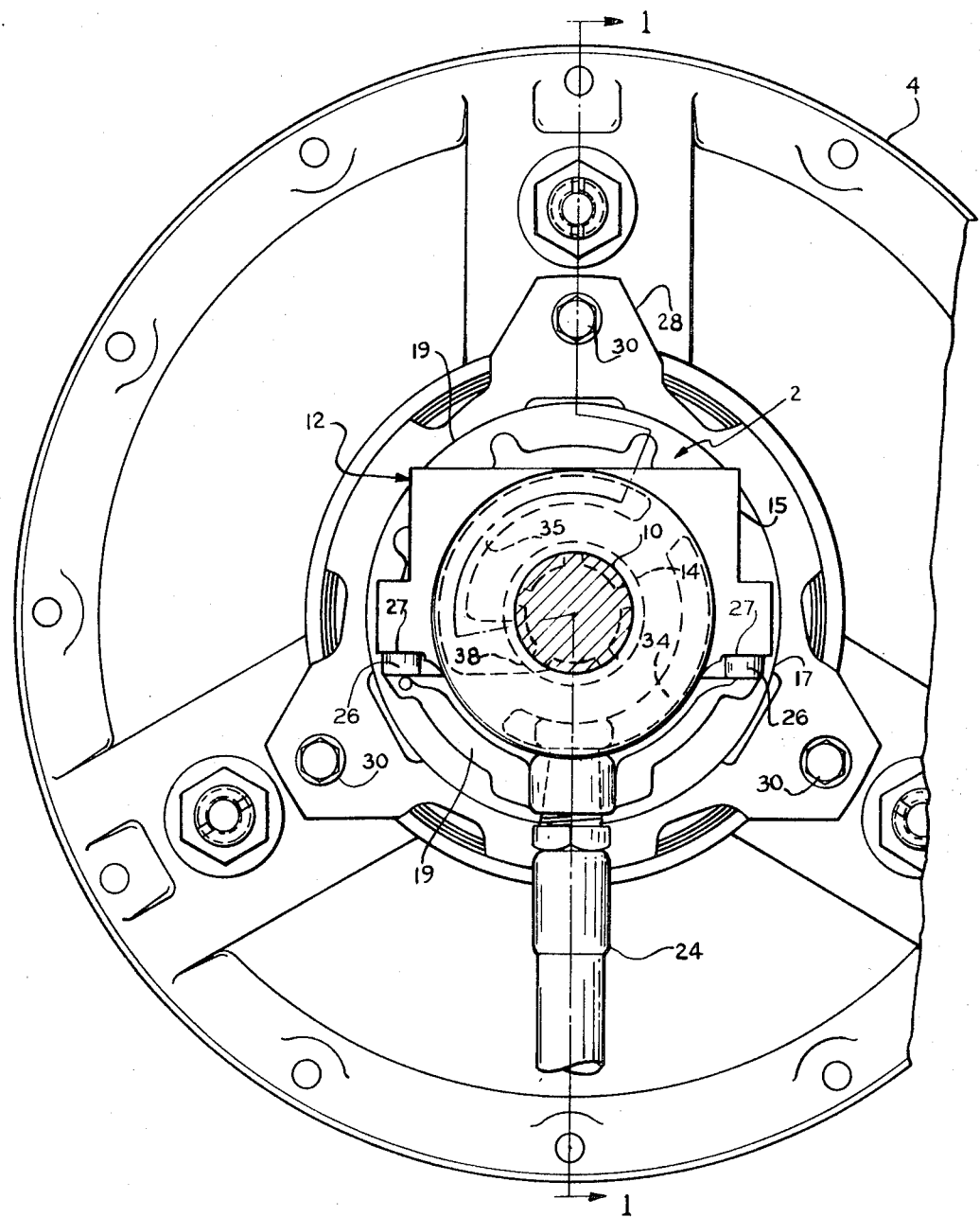
FIG. 2 is an elevation of the right side (or rear) of the clutch assembly of FIG. 1 with the transmission housing removed.

The pump body and cover plate are fixed in the clutch assembly, being held against rotational and axial movement by a threaded connection with a fluid intake conduit or pipe 24 that extends down into a sump 25. The pump is further held against rotation by the engagement of lugs 26 (FIG. 2) formed on the outside of the pump body with confronting lugs or shoulders 27 formed on the throwout member 15 of the pull mechanism sleeve 14, the sleeve being held against rotation by its engagement with the operating yoke as noted above. The engagement of the pump lugs 26 with the sleeve shoulders 27 also operates to guide the sleeve when it is moved axially on shaft 10 to disengage the clutch friction members.

The pump is driven through a direct connection between the clutch input means and the pump rotors 21,22, this connection comprising a spider plate 28 having a central hub 29 which encircles the pull sleeve 14. Plate 28 is secured as by screws 30 to the clutch cover plate 4, FIGS. 1 and 2, and its hub extends through the pump cover 20 into the pump interior where inner geroter 21 is secured to it by a key 31 and snap ring 32. With this arrangement, plate 28, its hub 29 and the gerotors comprise the drive or rotating part of the pump assembly with the remainder of the pump being stationary, and the pump operates whenever the vehicle engine is running whether the clutch is engaged or not.

The pump body 19 is formed with an intake cavity 34 and discharge cavity 35, and when the pump is operating the oil or other fluid is drawn from the sump 25 through pipe 24 and cavity 34 into an expanding chamber 36 between the gerotors. Oil in the chamber 36 is carried by the rotors to a point at 37 nearly diametrically opposite where it is forced into the discharge cavity 35 due to the decreasing size of the oil carrying chamber in the manner known in gerotor type pumps.

From discharge cavity 35, the fluid passes down into an opening 38 in the wall of the pull sleeve 14, the opening being long enough to communicate with the discharge cavity over the full length of possible axial movement of the sleeve. The sleeve opening 38 communicates with an annular groove or channel 39 formed in the inside of the sleeve wall, and channel 39 in turn communicates with a plurality of longitudinal inside wall channels 40 which extend to the inner or forward end of the sleeve. As indicated in FIG. 1, at least some of the channels 40 communicate with radial passages 41 through the sleeve collar 16 to provide lubrication for the thrust bearing 17.

Mounted on the inner end of sleeve 14 is a trough 42 which directs fluid from the channels 40 into an annular recess 44 in a splined hub member 45 carrying the driven disc assemblies 46. Recess 44 is formed with a plurality of deeper, circumferentially spaced bores 47 which communicate with radial passages 48 in the hub so that fluid entering the bores is ejected through the radial passages and cools the disc assemblies and associated driving plates. Excess fluid collects in the sump 25 and is recirculated.

The pull sleeve 14 may be spaced from the ouput shaft 10 by a pair of graphite impregnated bushings 49 which provide additional lubrication and ensure unhampered relative movement between the parts.

From the foregoing description it will be apparent that the invention provides a novel and very practical internal pump arrangement for a fluid clutch. As will be understood by those familar with the art, the invention may be embodied in other specific forms without departing from the spirit or essential characteristics thereof.

We claim:

1. In a friction clutch assembly having power input means, a driven shaft and means for normally effecting a driving connection between the input means and shaft: means including a nonrotatable sleeve member operatively connected to the clutch and axially slidably mounted on the driven shaft for disengaging the driving connection, a pump encircling the nonrotatable sleeve member, the pump including a housing fixed against axial and rotational movement and rotatable pumping means in the housing, and means directly connecting the power input means with the pumping means to drive the latter.

2. A clutch assembly as defined in claim 1 together with an intake conduit in the clutch for the pump, the pump housing being fixed against movement by the conduit.

3. In a friction clutch assembly having power input means, a driven shaft and normally engaged friction members for effecting a driving connection between the input means and shaft: a nonrotatable sleeve member mounted on the driven shaft for disengaging the friction members, the sleeve member being operable upon axial movement away from the friction members to effect the disengagement, a fluid pump disposed radially outwardly from the nonrotatable sleeve member in concentric relation thereto, the pump including a housing fixed against axial and rotational movement and rotatable pumping means in the housing, and means directly connecting the power input means with the pumping means to drive the latter, the last-named means comprising a plate and hub member disposed radially outwardly from the nonrotatable sleeve member in concentric relation thereto, the plate being secured to the power input means and the hub projecting into the pump housing and being operably connected to the pumping means therein.

4. A clutch assembly as defined in claim 3 wherein the pump is a gerotor pump.

* * * * *